(No Model.)
S. D. TUCKER.
PISTON PACKING.
No. 271,003. Patented Jan. 23, 1883.
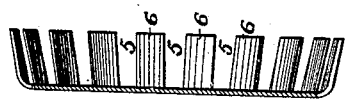
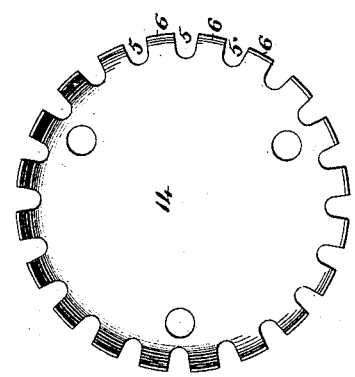
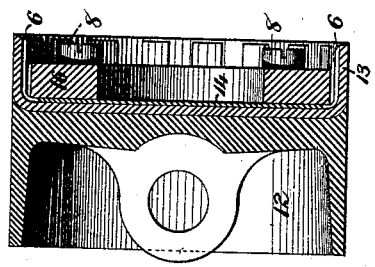
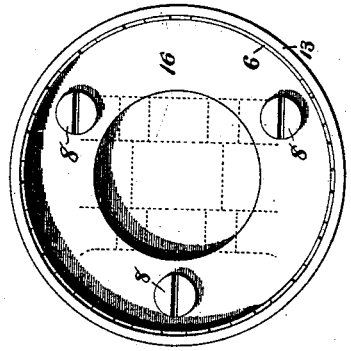
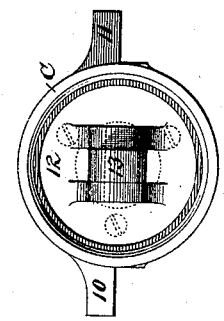
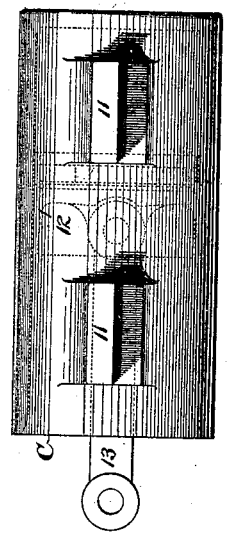
Attest;
Geo. H. Graham
T. H. Palmer
Inventor,
Stephen D. Tucker,
by Munson & Philipp
Att'ys.

UNITED STATES PATENT OFFICE.

STEPHEN D. TUCKER, OF NEW YORK, N. Y.

PISTON-PACKING.

SPECIFICATION forming part of Letters Patent No. 271,003, dated January 23, 1883.

Application filed May 21, 1881. (No model.)

*To all whom it may concern:*

Be it known that I, STEPHEN D. TUCKER, a citizen of the United States, residing in the city of New York, county of New York, and State of New York, have invented certain new and useful Improvements in Piston-Packing, fully described and represented in the following specification and the accompanying drawings, forming a part of the same.

My invention relates to an improvement in spring-packing for pistons, which is applicable to the pistons for air-cylinders, pumps, hydraulic presses, &c.

The improvement effected consists in providing the ordinary flexible cup-packing with what may be called a "basket-spring"—that is, a cup-like spring the flange of which is divided by narrow openings produced by removed portions, which provide a multiplicity of spring-arms adapted to bear independently against the inner surface of the flange of the cup-packing, whereby said flange is elastically pressed outwardly and into contact with the surface of the cylinder during the reciprocating movements of the piston, thus causing such packing to press evenly and snugly against the wall of the cylinder and to closely fit the same, thereby compensating for any wear and securing a close and tight working contact.

In the accompanying drawings I have illustrated my improvement as applied to the piston of an air-cylinder, Figure 1 showing a side elevation, and Fig. 2 an end elevation, of such cylinder, with the piston at rest within it. Fig. 3 shows a front end elevation of the piston; Fig. 4, a transverse sectional elevation thereof, and Figs. 5 and 6 a front elevation and transverse sectional elevation of the basket-spring.

Great ingenuity has been expended in improving packings for pistons, owing to the defective operation of such packing, which, after but a short use, will so wear as to misfit or lose its close bearing contact with the walls of the cylinder, whereby, especially when a gas or a fluid therein is under great pressure, either the effectiveness of the machine will be destroyed or a stoppage thereof and the tightening or refitting of such packing necessitated. This is especially so in air-cylinders, and notably in such as are used for cushioning the type-beds of printing-machines or taking up the motion of any other heavy body. In such it is particularly desirable that the packing shall not only closely fit the cylinder-wall, but be capable of long use without so wearing as to cause leakage or require repair.

The cylinder C here shown is provided with lugs 10 11, by which it may be bolted or otherwise secured to a frame-work, and is fitted with a piston, 12, having a piston-rod, 13, as is usual, through which or to which the power is applied. This piston 12 (shown enlarged in Figs. 3 and 4) has its front end constructed with a curved seat to better adapt it to receive the cup-packing 13, which may be of leather or other pliable material, as is common, and the periphery of the flange of which bears against the wall of the cylinder, as is usual. Such a packing, as is well known, will, no matter how closely fitted to the cylinder at the outset, soon become slightly worn, so as to permit leakage. Within this cup-packing I insert a basket-spring, 14—such as is shown in Figs. 5 and 6—the same being formed from a disk of spring metal by turning its edge upward to constitute a flange, from which, at short distances apart, portions of the metal plate are removed, so as to leave the openings, as 5, and provide a multiplicity of spring-arms, as 6, each of which is independently connected with the body of the basket-spring, so that it may act to press the flange of the cup-packing outwardly more or less, as may be required. The basket-spring thus constructed may be held in place within the flange of the cup-packing in any suitable way, a preferable method being the use of an annulus, 16, secured to the body of the piston 12 by means of screws 8, which, passing through it and holes in the spring and cup-packing, enter tapped holes in said piston. In practical operation these spring-arms 6 press against the rear wall of the cup-packing with an independent pressure exerted at a great number of points so close together as to in effect press outward the entire flange. Thus forced outwardly, the entire peripheral surface of the flange of the cup-packing will be elastically held in contact with the wall of the cylinder, and hence follow any slight irregularities thereof and maintain such close contact therewith as to effect a perfect joint, thus preventing the escape of any fluid or gas from which would result an injurious leakage.

What is claimed is—

A piston-packing consisting of a cup of leather or similar material and a removable basket-like spring having a number of independent pressing-arms, as 6, secured to a common base, and bearing against the inner surface of the flange of said cup-packing, substantially as described.

In testimony whereof I have hereunto set my hand in the presence of two subscribing witnesses.

STEPHEN D. TUCKER.

Witnesses:
CHAS. W. CARPENTER,
ALBERT S. BURLINGHAM.